US012348893B2

(12) United States Patent
Choo

(10) Patent No.: US 12,348,893 B2
(45) Date of Patent: Jul. 1, 2025

(54) DISPLAY DEVICE

(71) Applicant: LG ELECTRONICS INC., Seoul (KR)

(72) Inventor: Hyunseok Choo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 22 days.

(21) Appl. No.: 18/038,380

(22) PCT Filed: Nov. 27, 2020

(86) PCT No.: PCT/KR2020/017139
§ 371 (c)(1),
(2) Date: May 23, 2023

(87) PCT Pub. No.: WO2022/114299
PCT Pub. Date: Jun. 2, 2022

(65) Prior Publication Data
US 2024/0007587 A1 Jan. 4, 2024

(51) Int. Cl.
*H04N 5/655* (2006.01)
(52) U.S. Cl.
CPC ................... *H04N 5/655* (2013.01)
(58) Field of Classification Search
CPC ..................................................... H04N 5/655
See application file for complete search history.

(56) References Cited

U.S. PATENT DOCUMENTS 9,843,758 B2 * 12/2017 Park ........................ G09G 3/20
2004/0212756 A1   10/2004 Fukayama et al.
(Continued)

FOREIGN PATENT DOCUMENTS

CN         112562496      *  9/2019
KR      1020120017720         2/2012
(Continued)

OTHER PUBLICATIONS

Li, Jing, translation of CN 112562496 Sep. 26, 2019 (Year: 2019).*
(Continued)

*Primary Examiner* — Zaihan Jiang
(74) *Attorney, Agent, or Firm* — LEE, HONG, DEGERMAN, KANG & WAIMEY

(57) ABSTRACT

A display device is disclosed. The display device of the present disclosure comprises: a display panel; a frame positioned at the rear of the display panel; a holder coupled to the frame at the rear of the frame; and a back cover covering the rear of the frame, wherein the holder includes: a base in contact with the frame and fixed to the frame; and a banding part adjacent to the frame and having one end and the other end fixed to the base, wherein the banding part includes: a first tension part forming one end of the banding part and extending from the base; a seating part banded from the first tension part toward the frame and recessed toward the base; and a second tension part extending from the seating part toward the base and forming the other end of the banding part, wherein the back cover includes a coupling part which is curled from the end of the back cover toward the inner surface of the back cover and is seated on the seating part.

18 Claims, 15 Drawing Sheets

(56) References Cited

U.S. PATENT DOCUMENTS

| | | | |
|---|---|---|---|
| 2016/0198100 A1* | 7/2016 | Cho | H04M 1/0268 |
| | | | 348/222.1 |
| 2020/0057472 A1* | 2/2020 | Kang | G06F 1/1601 |
| 2020/0111990 A1* | 4/2020 | Lee | H10K 71/40 |
| 2021/0151541 A1* | 5/2021 | Lim | G02F 1/133512 |
| 2021/0192987 A1* | 6/2021 | Du | H10K 59/126 |
| 2021/0409532 A1* | 12/2021 | Lee | H04M 1/0268 |
| 2022/0026758 A1* | 1/2022 | Tao | G02F 1/133308 |
| 2022/0124913 A1* | 4/2022 | Kwak | H04M 1/02 |
| 2023/0111243 A1* | 4/2023 | Kang | G02F 1/133314 |
| | | | 349/56 |

FOREIGN PATENT DOCUMENTS

| | | |
|---|---|---|
| KR | 10-2016-0139832 | 12/2016 |
| KR | 10-2018-0026285 | 3/2018 |
| KR | 101843910 | 3/2018 |
| KR | 10-2019-0034969 | 4/2019 |
| KR | 10-2020-0116368 | 10/2020 |

OTHER PUBLICATIONS

PCT International Application No. PCT/KR2020/017139, International Search Report dated Jul. 16, 2021, 4 pages.
Korean Intellectual Property Office Application No. 10-2023-7017938, Office Action dated Aug. 23, 2024, 4 pages.
European Patent Office Application Serial No. 20963694.3, Search Report dated Jul. 23, 2024, 5 pages.

\* cited by examiner

[FIG. 1]
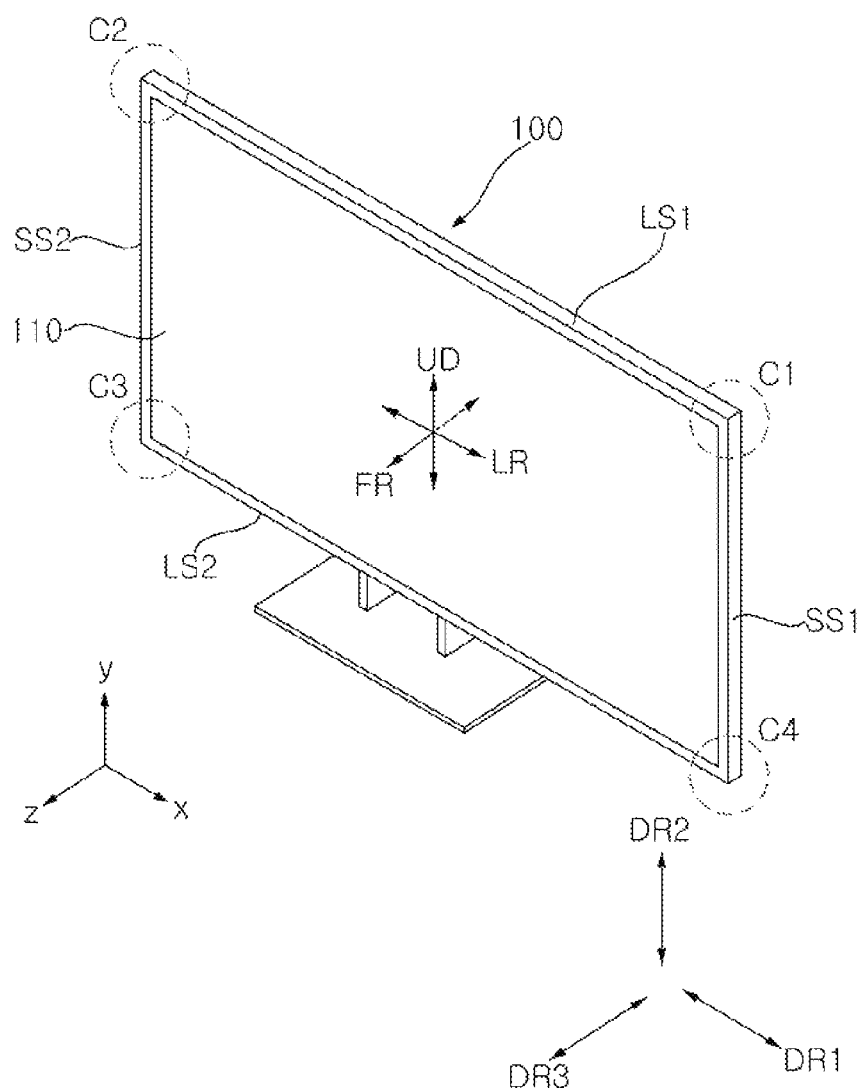

[FIG. 2]
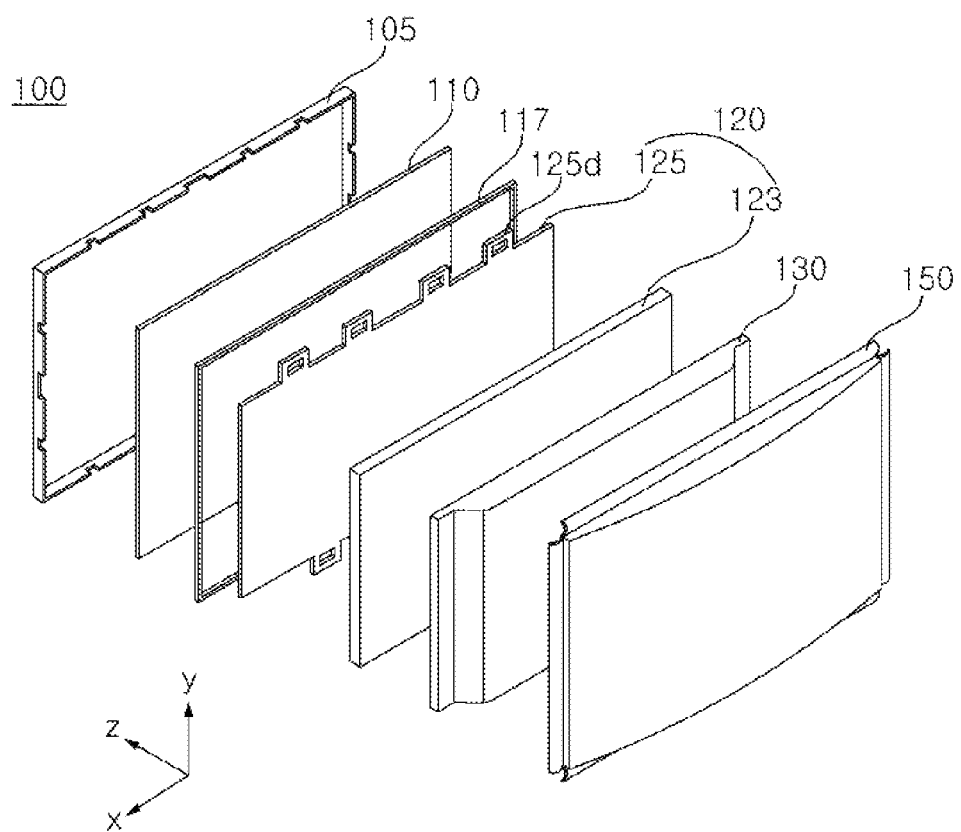

[FIG. 3]
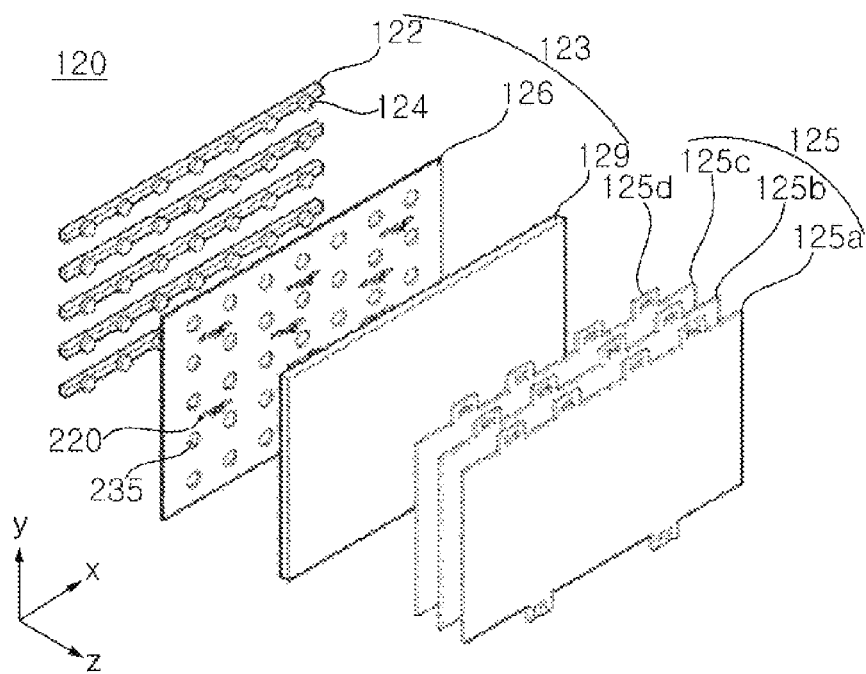

[FIG. 4]
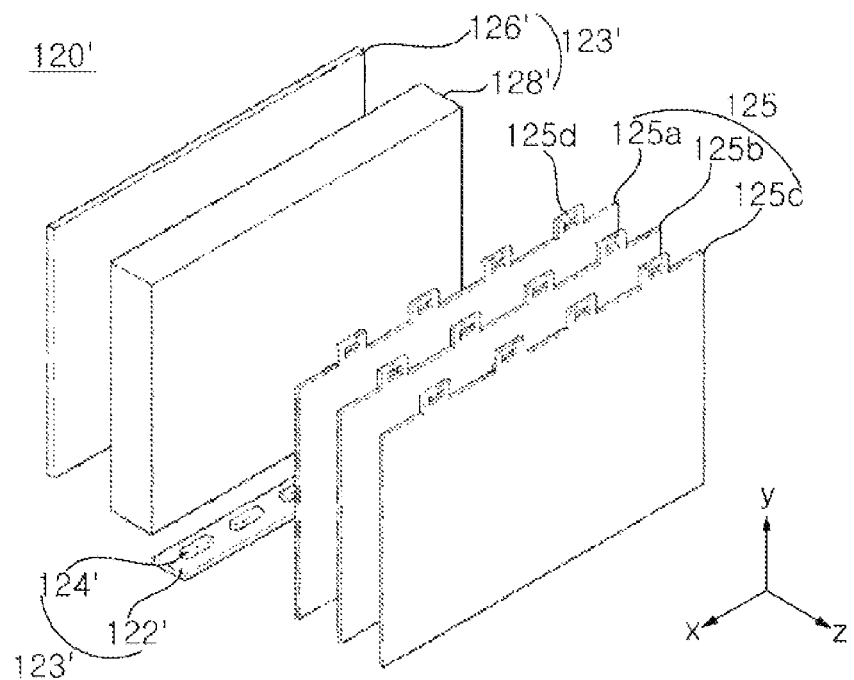

[FIG. 5]
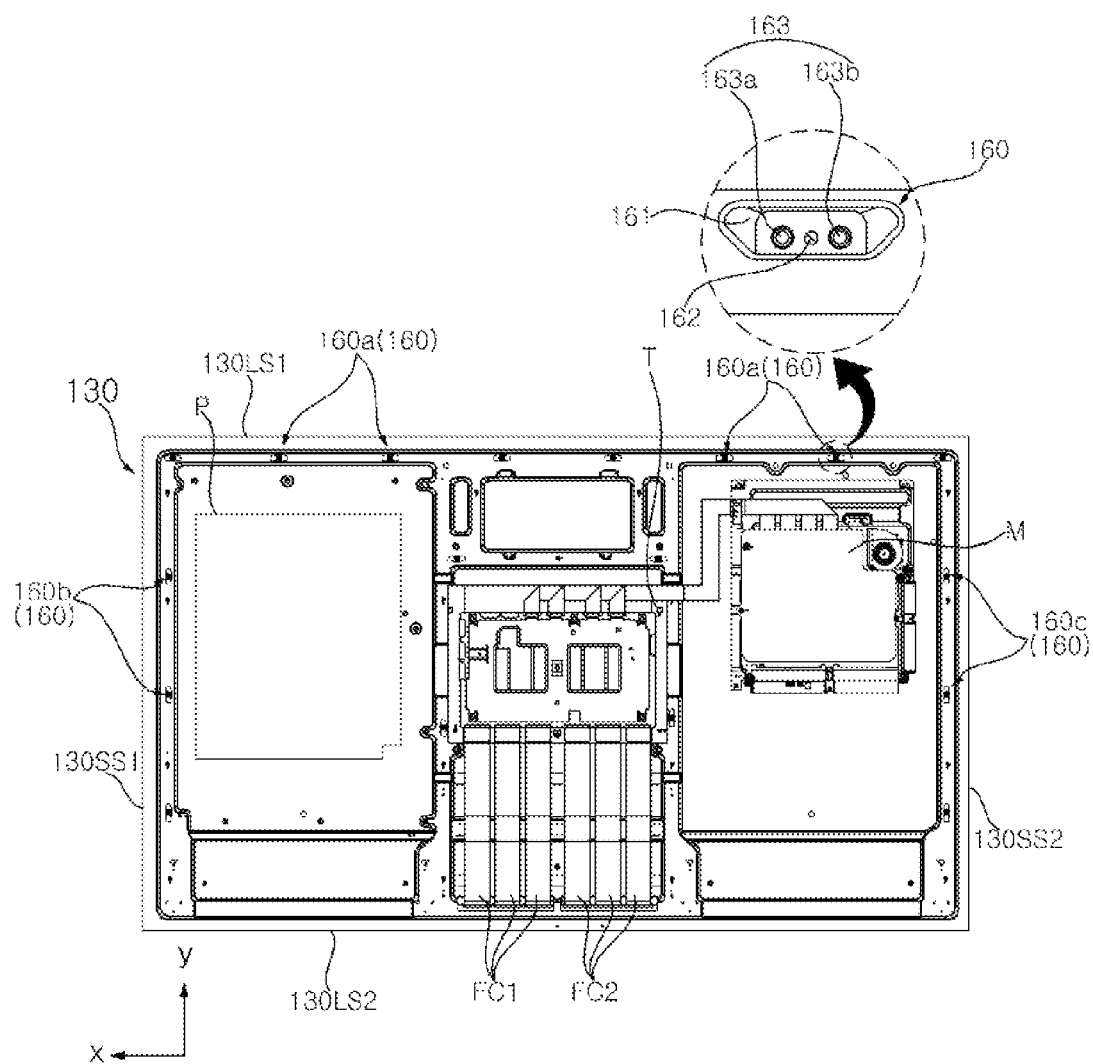

[FIG. 6]
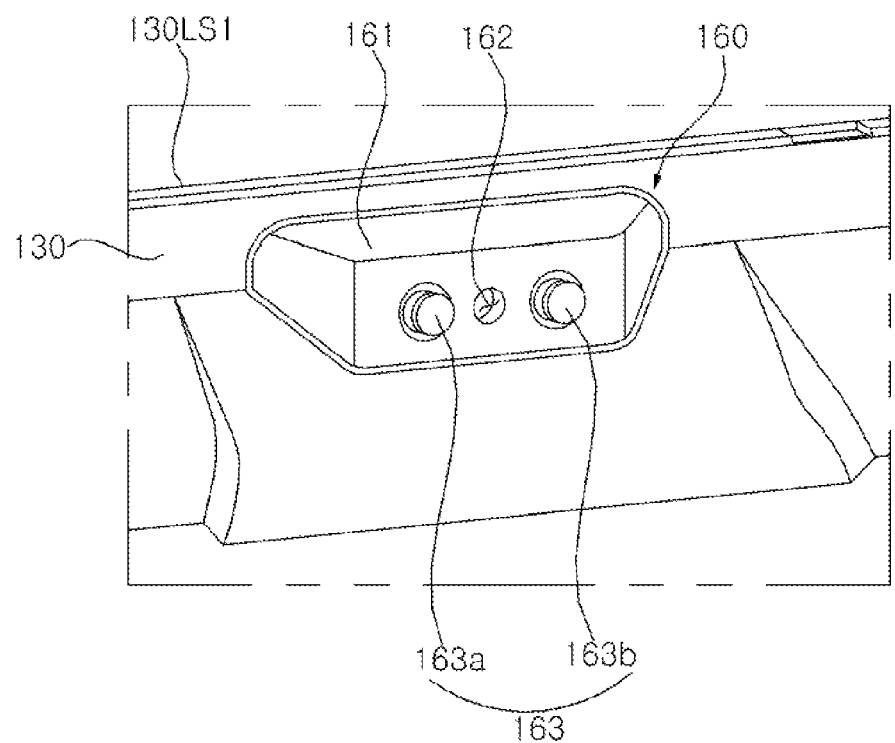

[FIG. 7]
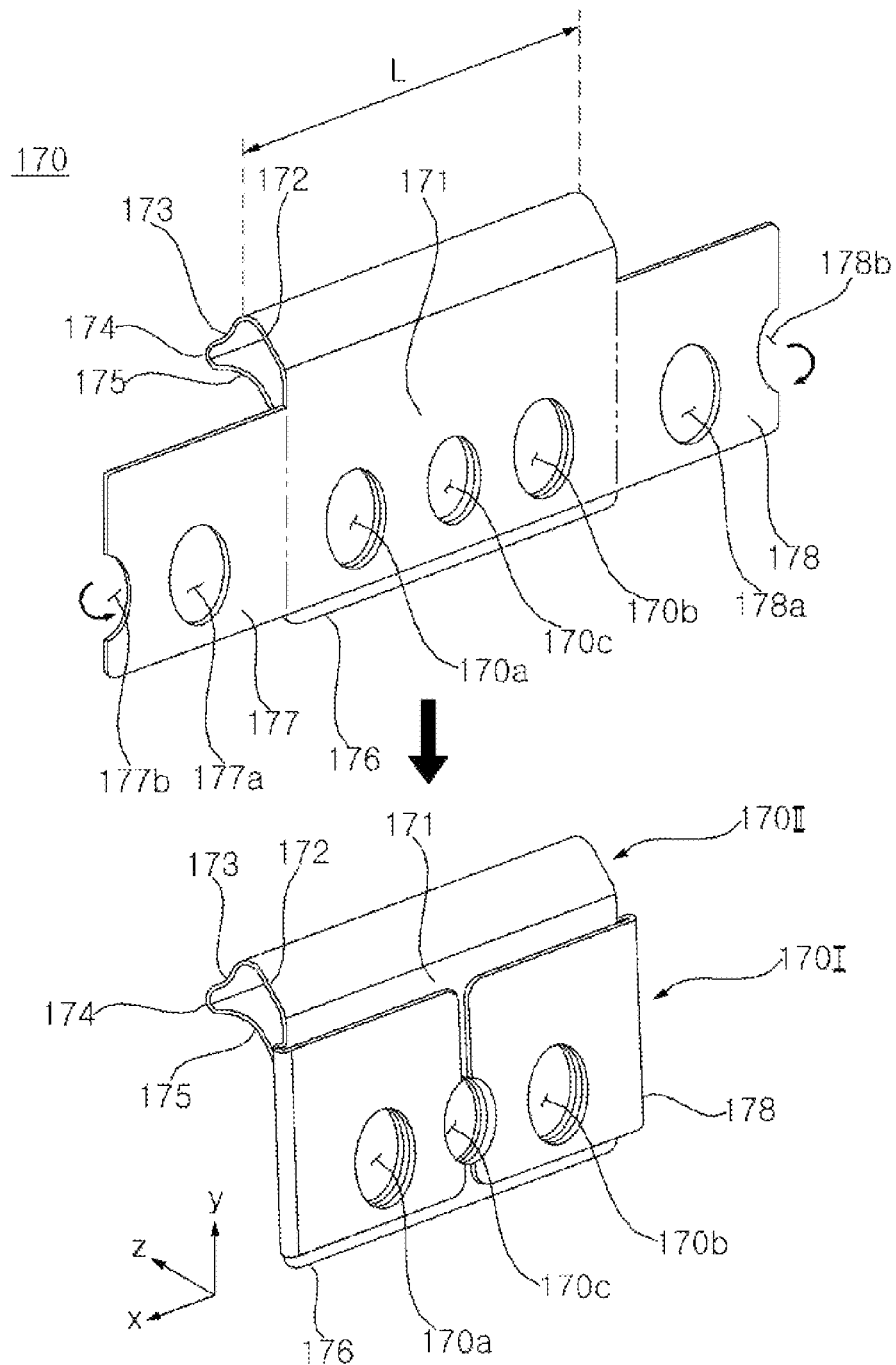

[FIG. 8]
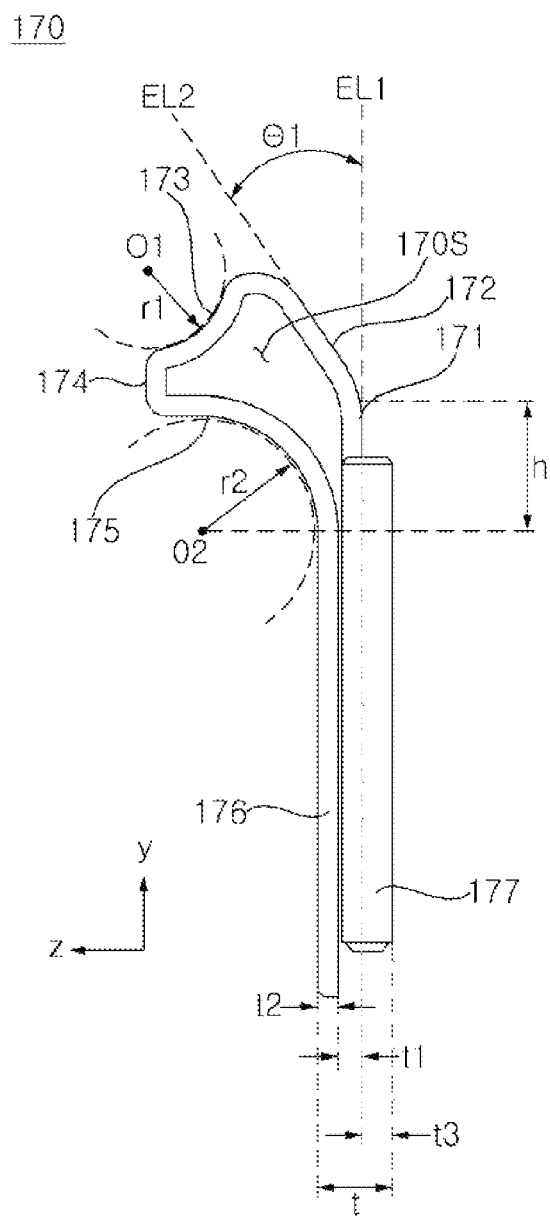

[FIG. 9]
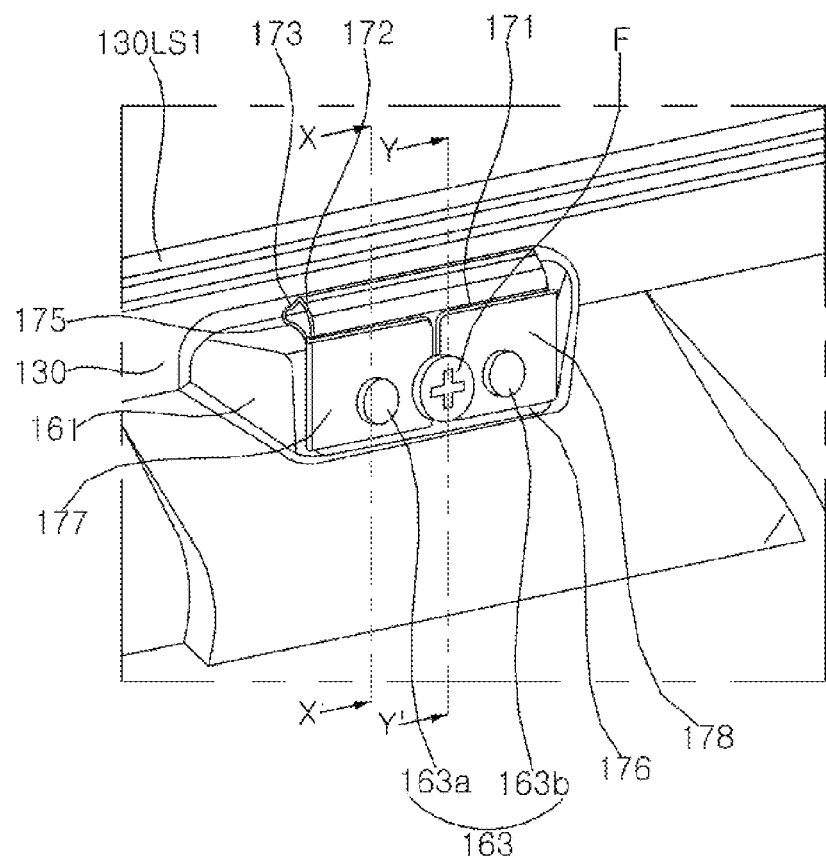

[FIG. 10]
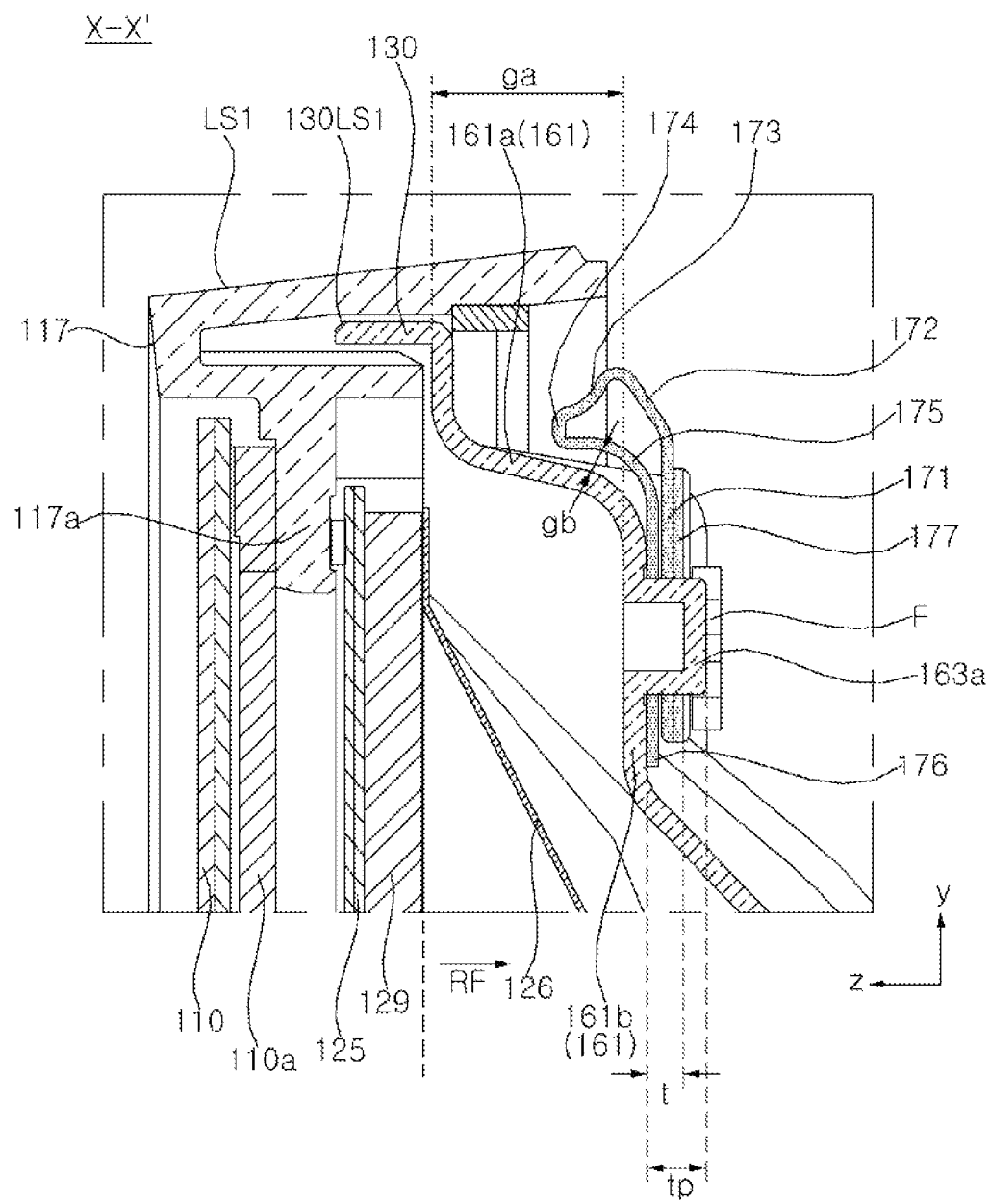

[FIG. 11]
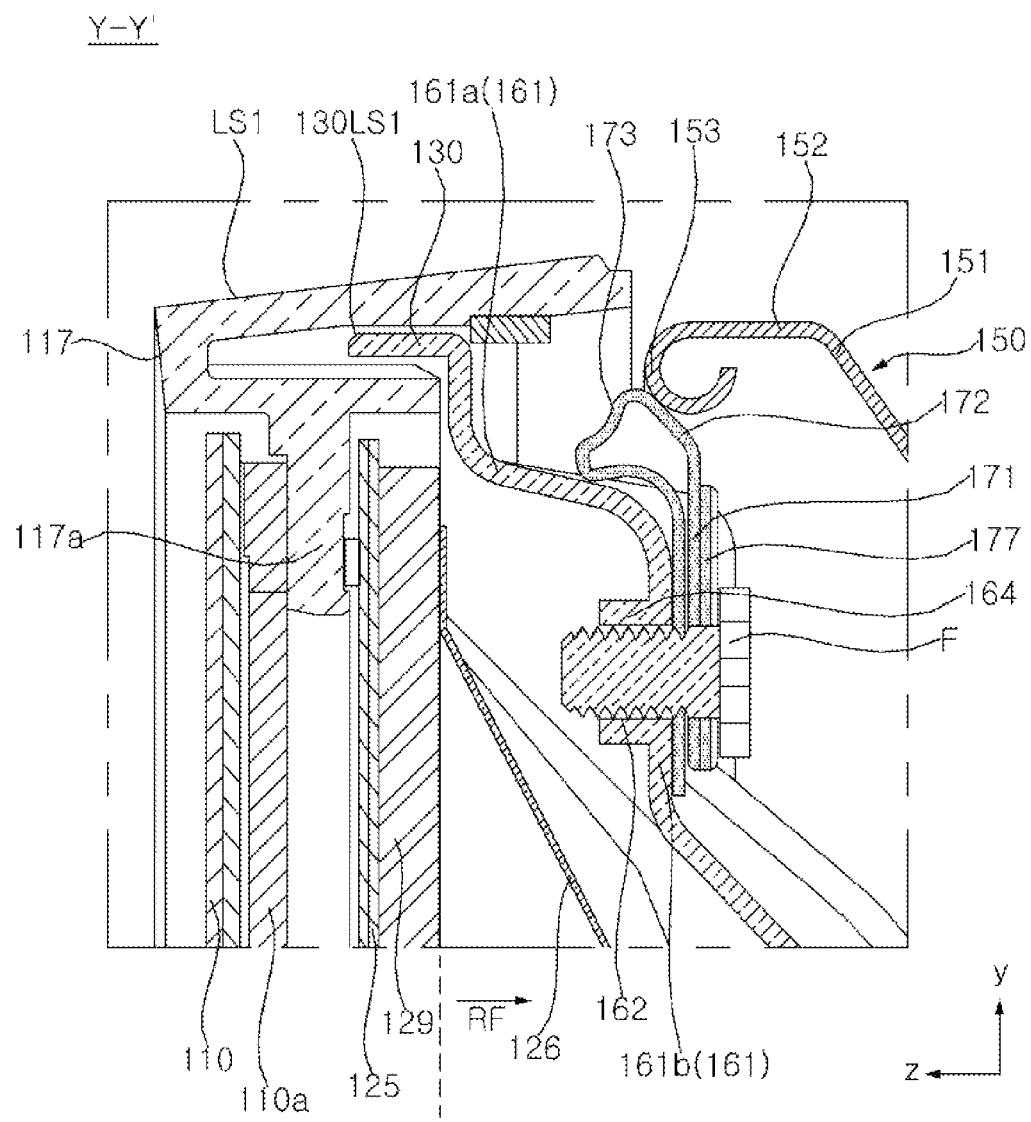

[FIG. 12]
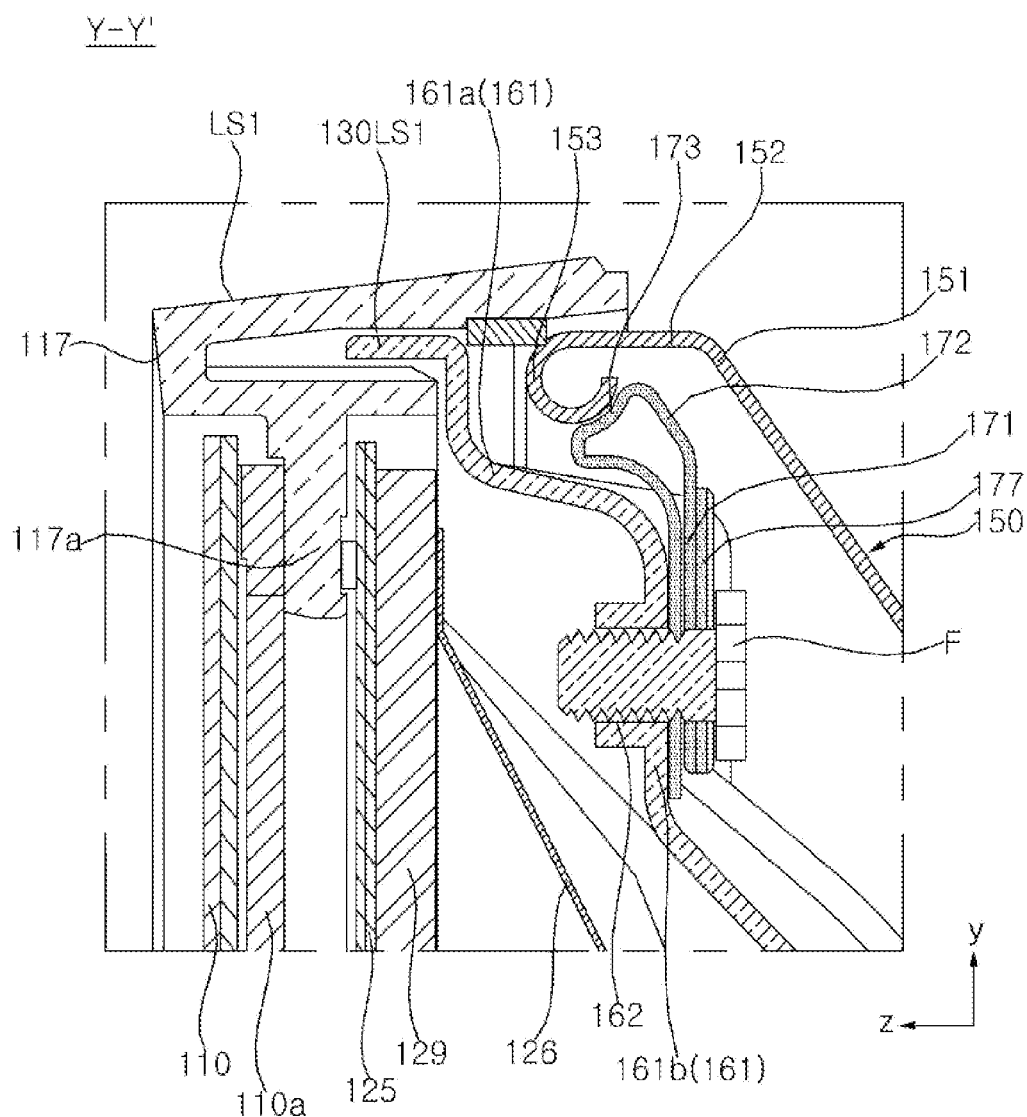

[FIG. 13]
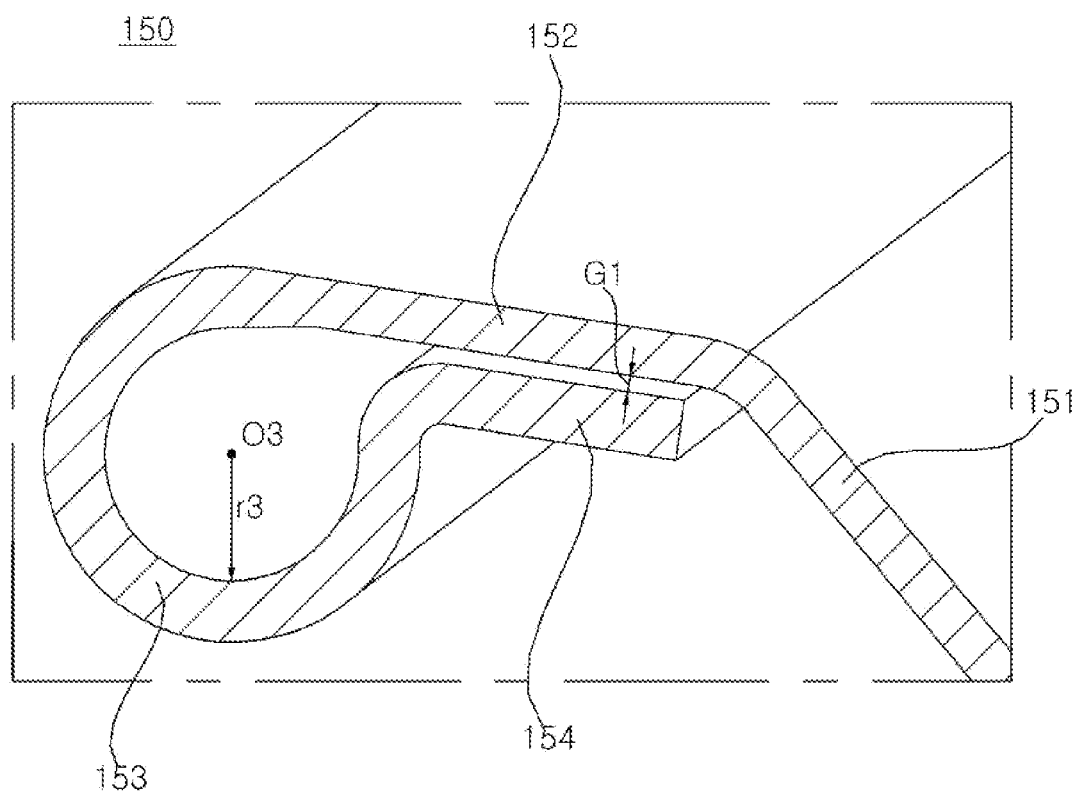

[FIG. 14]
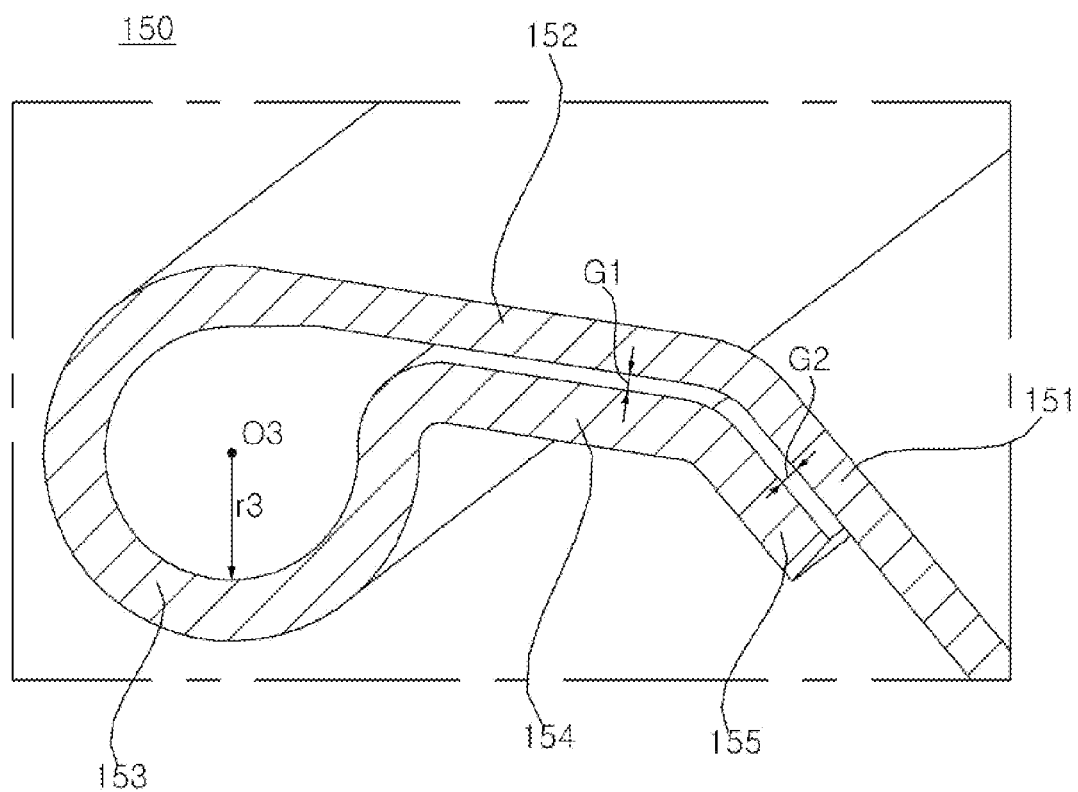

[FIG. 15]
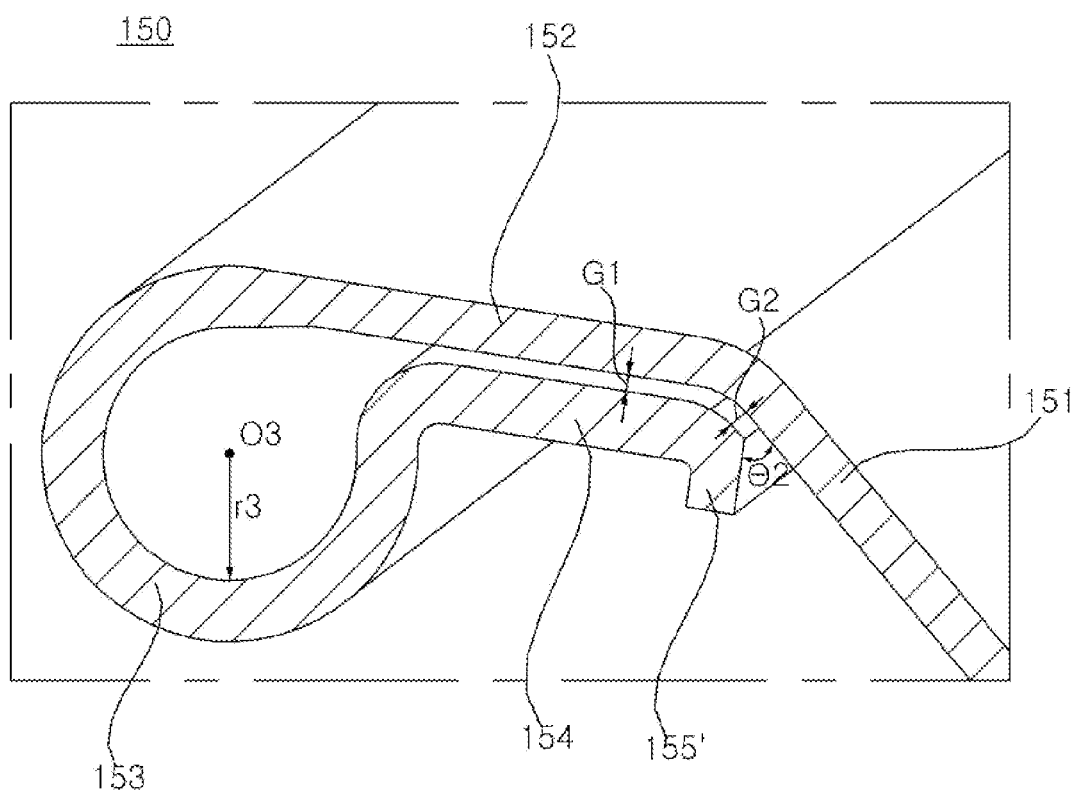

DISPLAY DEVICE

CROSS-REFERENCE TO RELATED APPLICATION

This application is the National Stage filing under 35 U.S.C. 371 of International Application No. PCT/KR2020/017139, filed on Nov. 27, 2020, the contents of which are hereby incorporated by reference herein in its entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Plasma Display Panel (PDP), Electroluminescent Display (ELD), and Vacuum Fluorescent Display (VFD) have been researched and used in recent years.

Among them, a display device using an organic light emitting diode (OLED) has superior luminance characteristics and viewing angle characteristics compared to a liquid crystal display device, and can be implemented in an ultra-thin shape as it does not require a backlight unit.

Recently, while securing the rigidity of a display device, research on improving the assembly structure of display device has been actively accomplished.

DISCLOSURE OF INVENTION

Technical Problem

It is an objective of the present disclosure to solve the above and other problems.

It is another objective to provide a coupling structure of back cover to a frame of display device.

It is yet another objective to provide a display device that can sufficiently secure the rigidity of a holder to which a back cover is coupled.

It is yet another objective to provide a display device that can minimize thermal deformation of a holder to which a back cover is coupled.

It is yet another objective to provide a display device that can reduce an EMI noise.

Solution to Problem

In accordance with an aspect of the present disclosure, there is provided a display device including: a display panel; a frame located in a rear of the display panel; a holder coupled to the frame at a rear of the frame; and a back cover covering the rear of the frame, wherein the holder includes: a base in contact with the frame, and fixed to the frame; and a bending part adjacent to the frame, and having one end and the other end fixed to the base, wherein the bending part includes: a first tension part forming the one end of the bending part, and extending from the base; a seating part bent toward the frame from the first tension part, and recessed toward the base; and a second tension part extending from the seating part toward the base, and forming the other end of the bending part, wherein the back cover includes a coupling part curled from a distal end of the back cover toward an inner surface of the back cover, and seated on the seating part.

Advantageous Effects of Invention

The display device according to the present disclosure has the following effects.

According to at least one of the embodiments of the present disclosure, there is provided a coupling structure of a back cover to a frame of a display device.

Another object may be to provide a display device that can sufficiently secure the rigidity of a holder to which a back cover is coupled.

Another object may be to provide a display device that can minimize thermal deformation of a holder to which a back cover is coupled.

Another object is to provide a display device that can reduce an EMI noise.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

BRIEF DESCRIPTION OF DRAWINGS

FIGS. 1 to 15 are diagrams illustrating examples of a display device according to embodiments of the present disclosure.

MODE FOR THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if the embodiment is described with reference to specific drawings, if necessary, reference numerals not appearing in the specific drawings may be referred to, and reference numerals not appearing in the specific drawings are used in a case where the above reference numerals appear in the other figures.

Referring to FIG. 1, a display device 100 may include a display panel 110. The display panel 110 may display an image.

The display device 100 may include a first long side LS1, a second long side LS2 opposite the first long side LS1, a first short side SS1 adjacent to one end of the first long side LS1 and the second long side LS2, and a second Short Side SS2 opposite to the first short side SS1. Meanwhile, for convenience of explanation, the lengths of the first and second long sides LS1 and LS2 are illustrated and described as being longer than the lengths of the first and second short sides SS1 and SS2, but a case in which the lengths of the first and second long sides LS1 and LS2 are approximately equal to the lengths of the first and second short sides SS1 and SS2 may also be possible.

A direction parallel to the long side LS1, LS2 of the display device 100 may be referred to as a first direction DR1 or a left-right direction LR. A direction parallel to the short side SS1, SS2 of the display device 100 may be referred to as a second direction DR2 or a up-down direction UD. A direction perpendicular to the long side LS1, LS2 and the short side SS1, SS2 of the display device 100 may be referred to as a third direction DR3 or a forward-rearward direction FR. Here, a direction in which the display panel 110 displays an image may be referred to as a forward direction, and a direction opposite to this may be referred to as a rearward direction.

The side of the first long side LS1 may be referred to as an upper side or an upper surface. The side of the second long side LS2 may be referred to as a lower side or a lower surface. The side of the first short side SS1 may be referred to as a left side or a left surface. The side of the second short side SS2 may be referred to as the right side or right surface.

The first long side LS1, the second long side LS2, the first short side SS1, and the second short side SS2 may be referred to as an edge of the display device. In addition, a point where the first long side LS1, the second long side LS2, the first short side SS1, and the second short side SS2 meet each other may be referred to as a corner.

For example, a point where the first long side LS1 and the first short side SS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Hereinafter, a display device 100 having a display panel 110 using an LCD panel will be described with reference to FIGS. 2 to 4, but the display device 100 according to the present disclosure may include various panels such as an OLED panel as the display panel 110.

Referring to FIG. 2, the display device 100 may include a front cover 105, a guide panel 117, a backlight unit 120, a frame 130, and a back cover 150, in addition to the display panel 110. Here, the display panel 110 may be an LCD panel.

The front cover 105 may cover at least partial area of the front and side surfaces of the display panel 110. The front cover 105 may be divided into a front cover located on the front surface of the display panel 110 and a side cover located on the side surface. The front cover and the side cover may be configured separately. Any one of the front cover and the side cover may be omitted.

The display panel 110 is provided on the front surface of the display device 100 and may display an image. The display panel 110 may display an image in such a manner that a plurality of pixels outputs RGB (Red, Green or Blue) per pixel according to the timing. The display panel 110 may be divided into an active area which displays an image and an inactive area which does not display an image. The display panel 110 may include a front substrate and a rear substrate facing each other with a liquid crystal layer interposed therebetween.

The front substrate may include a plurality of pixels including red R, green G, and blue B sub-pixels. The front substrate may output light corresponding to a color of red, green, or blue according to a control signal.

The rear substrate may include switching elements. The rear substrate may switch a pixel electrode. For example, the pixel electrode may change the molecular arrangement of the liquid crystal layer according to an externally applied control signal. The liquid crystal layer may include liquid crystal molecules. The arrangement of liquid crystal molecules may be changed in response to a voltage difference generated between the pixel electrode and a common electrode. The liquid crystal layer may transmit light provided from a backlight unit 120 to the front substrate or block the light.

The guide panel 117 may be located in a rear of the display panel 110. The guide panel 117 may support a portion of the rear surface of the display panel 110. The guide panel 117 may contact the outside of the display panel 110. The guide panel 117 may be coupled to a frame 130 described later.

The backlight unit 120 may be located in a rear of the display panel 110. The backlight unit 120 may include light sources. The backlight unit 120 may be coupled to the frame 130 at a front of the frame 130. The backlight unit 120 may be driven by a full driving method, or a partial driving method such as local dimming, and impulsive. The backlight unit 120 may include an optical sheet 125 and an optical layer 123.

The optical sheet 125 may evenly transmit light from a light source to the display panel 110. The optical sheet 125 may be composed of a plurality of layers. For example, the optical sheet 125 may include a prism sheet, a diffusion sheet, and the like.

The optical sheet 125 may include a coupling part 125d. The coupling part 125d may be coupled to the front cover 105, the frame 130, and/or the back cover 150. Alternatively, the coupling part 125d may be fastened to a structure formed on or coupled to the front cover 105, the frame 130, and/or the back cover 150.

The frame 130 may be located in a rear of the display panel 110. The frame 130 may support some components of the display device 100. For example, the backlight unit 120, a printed circuit board (PCB) on which a plurality of electronic devices are mounted, or the like may be coupled to or fixed to the frame 130. The frame 130 may include a metal material such as stainless steel, aluminum alloy, and electro galvanized coil (EGI). Meanwhile, the frame 130 may be referred to as a main frame, an inner frame, or a module cover.

The back cover 150 may form the rear surface of the display device 100. The back cover 150 may cover the rear of the frame 130. The back cover 150 may be coupled to the frame 130 and/or the front cover 105. For example, the back cover 150 may include a metal material.

Referring to FIG. 3, the backlight unit 120 may include an optical layer 123 including a substrate 122, at least one light assembly 124, a reflective sheet 126, and a diffusion plate 129, and an optical sheet 125 located in front of the optical layer 123.

The substrate 122 may be provided in the form of a plurality of straps that extend in the left-right direction LR and are spaced apart from each other in the up-down direction UD. At least one light assembly 124 may be mounted on the substrate 122. An electrode pattern for connecting the adapter and the light assembly 124 may be formed on the substrate 122. For example, a carbon nanotube electrode pattern for connecting the light assembly 124 and the adapter may be formed on the substrate 122.

The substrate 122 may be made of at least one of polyethylene terephthalate (PET), glass, polycarbonate (PC), and silicon. The substrate 122 may be a printed circuit board (PCB) on which at least one light assembly 124 is mounted.

The light assembly 124 may be a light emitting diode (LED) chip or a light emitting diode package including at least one light emitting diode chip. The light assembly 124 may be formed of a colored LED or a white LED that emits at least one color among colors such as red, green, and blue. The colored LED may include at least one of a red LED, a green LED, and a blue LED.

The reflective sheet 126 may be located in front of the substrate 122. The reflective sheet 126 may have a plurality of through holes 235 in which the light assembly 124 is located. The reflective sheet 126 may forwardly reflect the light that is emitted from the light assembly 124 or reflected from the diffusion plate 129. For example, the reflective sheet 126 may include a metal having a high reflectance such as at least one of aluminum Al, silver Ag, gold Au, and titanium dioxide TiO2 and/or a metal oxide.

An air gap may be formed between the reflective sheet 126 and the diffusion plate 129. The air gap may serve as a buffer, and allow the light emitted from the light assembly 124 to spread widely. A supporter 200 may be located between the reflective sheet 126 and the diffusion plate 129 to form the air gap.

The diffusion plate 129 may be located in front of the reflective sheet 126. The diffusion plate 129 may be located between the reflective sheet 126 and the optical sheet 125.

The optical sheet 125 may include at least one or more sheets. Specifically, the optical sheet 125 may include one or more prism sheets and/or one or more diffusion sheets. A plurality of sheets included in the optical sheet 125 may be in an adhesive and/or closely adhered state.

The optical sheet 125 may be formed of a plurality of sheets having different functions. For example, the optical sheet 125 may include a first optical sheet 125a, a second optical sheet 125b, and a third optical sheet 125c. For example, the first optical sheet 125a may be a diffusion sheet, and the second optical sheet 125b and the third optical sheet 125c may be a prism sheet. The number and/or location of the diffusion sheet and prism sheet may be varied. The diffusion sheet may prevent the light emitted from the diffusion plate 129 from being partially concentrated, thereby making the light distribution more uniform. The prism sheet may condense the light emitted from the diffusion plate 129 and provide the light to the display panel 110.

Referring to FIG. 4, the light source of a backlight unit 120' may be disposed in an edge. The backlight unit 120' may include an optical layer 123' including a substrate 122', at least one light assembly 124', a reflective sheet 126', and a light guide plate 128', and an optical sheet 125 located in front of the optical layer 123'.

The substrate 122' extends in the left-right direction LR, and may be adjacent to a lower side of the light guide plate 128'. At least one light assembly 124' may be mounted on the substrate 122'. Accordingly, most of the light emitted from the light assembly 124' may be transmitted to the inside of the light guide plate 128'. Here, the light guide plate 128' may forwardly reflect the light incident from the light assembly 124'. For example, a diffusion plate 129' may be provided on the front surface of the light guide plate 128'.

The reflective sheet 126' may be located in a rear of the light guide plate 128'. The reflective sheet 126' may reflect forward the light emitted from the light assembly 124' or reflected from the light guide plate 128'.

An air gap may be formed between the light guide plate 128' and the optical sheet 125. The air gap may serve as a buffer, and allow the light emitted from the light assembly 124' to spread widely.

The optical sheet 125 may be located in front of the light guide plate 128'. The rear surface of the optical sheet 125 may adhere to the light guide plate 128', and the front surface of the optical sheet 125 may adhere to the rear surface of the display panel 110.

The coupling part 125d may be formed on at least one of the corners of the optical sheet 125. The coupler 125d may be formed on at least one of the first optical sheet 125a, the second optical sheet 125b, and the third optical sheet 125c.

Referring to FIG. 5, a plurality of electronic components may be installed on the frame 130. The plurality of electronic components may be coupled to or fixed to the rear surface of the frame 130.

For example, the plurality of electronic components may include a power supply board P for providing power to each component of the display device 100, a timing controller board T for providing an image signal to the display panel 110 (see FIG. 1), and a main board M for controlling each component of the display device 100. In this case, the timing controller board T may be connected to the display panel 110 through FFC cables FC1 and FC2. A plurality of electronic components may be electrically connected to each other, or electrically connected to each component of the display device 100.

Referring to FIGS. 5 and 6, the frame 130 may be formed in a rectangular plate shape as a whole. The upper side 130LS1 of the frame 130 may extend in the left-right direction. The lower side 130LS2 of the frame 130 may face the upper side 130LS1 and may extend in the left-right direction. The left side 130SS1 of the frame 130 may extend in the up-down direction. The right side 130SS2 of the frame 130 may face the left side 130SS1, and may extend in the up-down direction. Meanwhile, the upper side 130LS1, the lower side 130LS2, the left side 130SS1, and the right side 130SS2 of the frame 130 may be referred to as edge of the frame 130.

A recessed part 160 may be adjacent to an edge of the frame 130. The recessed part 160 may include a body 161, a hole 162, and a protrusion 163. The body 161 may be formed while being recessed from the front surface of the frame 130 in a rearward direction. A hole 162 may be formed while penetrating the body 161 in the forward-rearward direction. A part of the body 161 defines a boundary of the hole 162, has a screw thread, and may be referred to as a tapping part 164 (see FIG. 11). The protrusion 163 may protrude rearward from the rear surface of the body 161. For example, the protrusion 163 may be formed in the shape of a solid cylinder. For example, the protrusion 163 may include a first protrusion 163*a* and a second protrusion 163*b* spaced apart from each other with the hole 162 therebetween. Meanwhile, the recessed part 160 may be referred to as a forming part, and the protrusion 163 may be referred to as an embo or a boss.

For example, the recessed part 160 may include a plurality of recessed parts spaced apart from each other in the circumferential direction of the frame 130. In this case, the recessed part 160 may include a first recessed part 160*a*, a second recessed part 160*b*, and a third recessed part 160*c*. The first recessed part 160*a* may be adjacent to the upper side 130LS1 and may be provided in plurality. The second recessed part 160*b* may be adjacent to the left side 130SS1 and may be provided in plurality. The third recessed part 160*c* may be adjacent to the right side 130SS2 and may be provided in plurality. Meanwhile, the recessed part 160 may further include a fourth recessed part (not shown) that is adjacent to the lower side 130LS2 and provided in plurality.

In this case, the first recessed part 160*a* and the fourth recessed part may include the first protrusion 163*a* and the second protrusion 163*b* spaced apart from each other in the left-right direction. In addition, the second recessed part 160*b* and the third recessed part 160*c* may include the first protrusion 163*a* and the second protrusion 163*b* spaced apart from each other in the up-down direction.

Referring to FIGS. 7 and 8, a holder 170 may include a base 170I and a bending part 170II. Meanwhile, the holder 170 may be referred to as a bracket or a mount.

The base 170I may be extended long. A coupling hole 170*c* and a guide hole 170*a*, 170*b* may be formed to penetrate the base 170I in the thickness direction of the base 170I. Here, the thickness direction of the base 170I may intersect the length direction of the base 170I. The guide hole 170*a*, 170*b* may be provided as many as the number of protrusions 163 (see FIG. 6) described above. That is, the guide hole 170*a*, 170*b* may include a first guide hole 170*a* and a second guide hole 170*b* spaced apart from each other in the length direction of the base 170I with the coupling hole 170*c* therebetween.

For example, the base 170I may be coupled to the first recessed part 160*a* and/or the fourth recessed part (see FIG. 5). In this case, the length direction of the base 170I may be parallel to the left-right direction, and the first guide hole 170*a* and the second guide hole 170*b* may be spaced apart from each other in the left-right direction. In addition, the thickness direction of the base 170I may be parallel to the forward-rearward direction.

For example, the base 170I may be coupled to the second recessed part 160*b* and/or the third recessed part 160*c* (see FIG. 5). In this case, the length direction of the base 170I may be parallel to the vertical direction, and the first guide hole 170*a* and the second guide hole 170*b* may be spaced apart from each other in the vertical direction. In addition, the thickness direction of the base 170I may be parallel to the forward-rearward direction.

The bending part 170II may extend long in the length direction of the base 170I. The length L of the bending part 170II may be equal to or smaller than the length of the base 170I. The bending part 170II may be fixed to or coupled to one side of the base 170I. The bending part 170II is bent multiple times and may have one end and the other end that are adjacent to each other or neighbor to each other. In this case, one end and the other end of the bending part 170I may be fixed to or coupled to one side of the base 170I. In addition, an inner surface of the bending part 170II may define a boundary of a space 170S extending in a length direction of the bending part 170II.

For example, the base 170I may be coupled to the first recessed part 160*a*. In this case, one end and the other end of the bending part 170II may be fixed to the upper surface of the base 170I. For example, the base 170I may be coupled to the fourth recessed part. In this case, one end and the other end of the bending part 170II may be fixed to the lower surface of the base 170I.

For example, the base 170I may be coupled to the second recessed part 160*b*. In this case, one end and the other end of the bending part 170II may be fixed to the left side surface of the base 170I. For example, the base 170I may be coupled to the third recessed part 160*c*. In this case, one end and the other end of the bending part 170II may be fixed to the right side surface of the base 170I.

Meanwhile, a groove 173 may be formed while being recessed from the outer surface of the bending part 170II toward the space 170S or the base 170I. The groove 173 may extend long in the length direction of the bending part 170II. The groove 173 may be formed to be curved.

Meanwhile, the aforementioned base 170I and bending part 170II may be formed as one body. That is, the holder 170 may prepare the base 170I and the bending part 170II by bending one plate a plurality of times. Specifically, the holder 170 may include a first part 171, a second part 172, a third part 173, a fourth part 174, a fifth part 175, and a sixth part 176. At this time, the first part 171 and the sixth part 176 constitute the base 170I, and the second part 172, the third part 173, the fourth part 174, and the fifth part 175 may constitute the bending part 170II.

The first part 171 and the sixth part 176 may elongate in the same direction. The first part 171 and the sixth part 176 may be a flat plate. The first part 171 may be located in a rear of the sixth part 176, and may contact the sixth part 176. That is, in the forward-rearward direction, the first part 171 and the sixth part 176 may overlap each other. In addition, the coupling hole 170*c* and the guide hole 170*a*, 170*b* may be formed to penetrate the first part 171 and the sixth part 176. Meanwhile, the first part 171 may be referred to as a first base, and the sixth part 176 may be referred to as a second base.

The second part 172 may form a first angle (theta 1) from the first part 171 and extend while being bent forward, and may form one end of the aforementioned bending part 170II. In this case, the first angle (theta 1) may be an acute angle. For example, the second part 172 may be formed flat. Meanwhile, the second part 172 may be referred to as a first tension part.

The third part 173 may extend while being rolled forward from the second part 172, and form the aforementioned groove 173. In this case, the third part 173 may extend while drawing an arc having a first radius r1 with respect to a first center O1 located outside the space 170S. That is, the third part 173 may be concave toward the space 170S. Meanwhile, the third part 173 may be referred to as a seating part.

The fourth part 174 may extend while being bent from the third part 173, and may be formed flat. For example, the fourth part 174 may extend in a direction perpendicular to the tangent of the arc. The fourth part 174 may be formed flat. Meanwhile, it is also possible that the fourth part 174 is omitted and the third part 173 is connected to a fifth part 175 described later.

The fifth part 175 extends from the fourth part 174 while being rolled rearward or towards the base 170I, and may form the other end of the aforementioned bending part 170II. At this time, the fifth part 175 may extend while drawing an arc of the second radius r2 with respect to a second center O2 located outside the space S. That is, the fifth part 175 may be concave toward the space 170S or the base 170OI. Meanwhile, the fifth part 175 may be referred to as a second tension part.

In addition, a distal end of the second part 172 is connected to the first part 171, and may form one end of the aforementioned bending part 170II. A distal end of the fifth part 175 is connected to the sixth part 176, and may form the other end of the aforementioned bending part 170II. In this case, the distal end of the fifth part 175 may be spaced apart from the distal end of the second part 172 by a certain distance h in a direction intersecting the length direction of the bending part 170II.

For example, the base 170I may be coupled to the first recessed part 160a. In this case, the distal end of the fifth part 175 may be spaced downward from the distal end of the second part 172 by a certain gap h. For example, the base 170I may be coupled to the fourth recessed part. In this case, the distal end of the fifth part 175 may be spaced upward from the distal end of the second part 172 by a certain gap h.

For example, the base 170I may be coupled to the second recessed part 160b. In this case, the distal end of the fifth part 175 may be spaced apart from the distal end of the second part 172 to the right by a certain gap h. For example, the base 170I may be coupled to the third recessed part 160c. In this case, the distal end of the fifth part 175 may be spaced apart from the distal end of the second part 172 to the left by a certain gap h.

Accordingly, the inner surfaces of a part of the first part 171, the second part 172, the third part 173, the fourth part 174, and the fifth part 175 may define the boundary of the space 170S. In addition, as one end and the other end of the bending part 170II are fixed to the base 170I, external force or stress applied to the bending part 170II may be distributed to the bending part 170II and the base 170I.

A seventh part 177 and an eighth part 178 are located in a rear of the first part 171, and may be adjacent to each other. The seventh part 177 and the eighth part 178 may contact the first part 171. In addition, the coupling hole 170c and the first guide hole 170a may be formed to penetrate the seventh part 177, the first part 171, and the sixth part 176. In addition, the coupling hole 170c and the second guide hole 170b may be formed to penetrate the eighth part 178, the first part 171, and the sixth part 176. Meanwhile, the seventh part 177 and the eighth part 178 may be referred to as a third base.

For example, the seventh part 177 may extend from one end of the first part 171 in the length direction of the first part 171 and then be folded toward the rear surface of the first part 171. The seventh part 177 may include a first-first hole 177a and a first-second hole 177b formed to penetrate the seventh part 177 in the front-rear direction. The first-first hole 177a may form a part of the first guide hole 170a, and the first-second hole 177b may form a part of the coupling hole 170c.

For example, the eighth part 178 may extend from the other end of the first part 171 in the length direction of the first part 171 and then be folded toward the rear surface of the first part 171. The eighth part 178 may include a second-first hole 178a and a second-second hole 178b formed to penetrate the eighth part 178 in the forward-rearward direction. The second-first hole 178a may form a part of the second guide hole 170b, and the second-second hole 178b may form a part of the coupling hole 170c.

In this case, the seventh part 177 and the eighth part 178 may constitute the base 170I together with the first part 171 and the sixth part 176. That is, the thickness t of the base 170I may be the sum of the thickness t1 of the first part 171, the thickness t2 of the sixth part 176, and the thickness t3 of the seventh part 177. Here, the thickness t3 of the seventh part 177 may be the same as the thickness of the eighth part 178. Accordingly, torsional rigidity and/or bending rigidity of the base 170I may be improved.

Referring to FIGS. 9 and 10, the holder 170 may be coupled to the frame 130 at the rear of the frame 130. Here, FIG. 10 is a cross section taken along line X-X' of FIG. 9. The holder 170 may be located at the rear of the recessed part 160, and may be detachably coupled to the recessed part 160.

The first protrusion 163a may be inserted into the first guide hole 170a (see FIG. 7), and the second protrusion 163b may be inserted into the second guide hole 170b (see FIG. 7). In this case, the first protrusion 163a may protrude from the rear surface of the body 161 by a certain length tp. Here, the certain length tp is the same as the protruding length of the second protrusion 163b from the rear surface of the body 161, and may be greater than the thickness t of the base 170I. Thus, the first protrusion 163a and the second protrusion 163b can stably support the holder 170 into which they are inserted.

Further, when the first protrusion 163a and the second protrusion 163b are inserted into the first guide hole 170a and the second guide hole 170b, the coupling hole 170c (see FIG. 7) may be aligned in the hole 162 (see FIG. 6). Accordingly, the first protrusion 163a and the second protrusion 163b may guide the coupling of the holder 170 to the recessed part 160.

Further, a fastening member F, such as a screw, may be inserted into the hole 162 through the coupling hole 170c and screwed to the tapping part 164 (see FIG. 11). Thus, the holder 170 may be fixed to the recessed part 160.

Meanwhile, the body 161 may include a first body 161a extending obliquely or vertically with respect to the front surface of the frame 130 and a second body 161b extending flatly with respect to the front surface of the frame 130. The first protrusion 163a, the second protrusion 163b, and the hole 162 may be provided in the second body 161b.

In this case, the sixth part 176 may be located in a rear of the second body 161b, and may contact the second body 161b. In addition, the fifth part 175 may be located in a rear of the first body 161a, and may be spaced apart from the first body 161a by a certain gap (gb). Accordingly, the second part 172 and the fifth part 175 may be elastically deformed toward the first body 161a according to an external force, or may be return to an original position, that is, to a position where the fifth part 175 is spaced apart from the first body 161a by a certain gap (gb) according to an elastic force.

Referring back to FIG. 10, the guide panel 117 may form a side surface of the display device 100. A rib 117a may protrude toward the inner side of the display device 100 from the guide panel 117. A foam pad 110a may be coupled to the display panel 110 and the rib 117a at between the display panel 110 and the rib 117a. The optical sheet 125 and the diffusion plate 129 may face the foam pad 110a with respect to the rib 117a.

A portion forming the outer edge of the frame 130 may be inserted into the guide panel 117. The frame 130 may be fixed to the guide panel 117.

A rim (no reference numeral) of the reflective sheet 126 may contact the rear surface of the diffusion plate 129, and the remaining portion of the reflective sheet 126 may obliquely extend in a rearward direction from the rim (see RF in FIG. 10). In this case, the front surface of the second body 161b may be spaced apart from the front surface of the frame 130 in a rearward direction by a certain gap (ga). Accordingly, the fastening member F fastened to the tapping part 164 may not interfere with or contact the reflective sheet 126.

Referring to FIGS. 11 and 12, the back cover 150 may be located at the rear of the frame 130, and may cover the rear of the frame 130. Here, FIGS. 11 and 12 are a cross-section taken along the line Y-Y' of FIG. 9. The back cover 150 may include a cover part 151, a connection part 152, and a coupling part 153.

The cover part 151 may form the rear surface of the back cover 150. The cover part 151 may cover the recessed part 160 and the rear of the holder 170. The cover part 151 may be formed flat or inclined with respect to the frame 130. The connection part 152 may form a side surface of the back cover 150. The connection part 152 may be bent from the cover part 151, and may extend toward the frame 130. An angle between the connection part 152 and the cover part 151 may be an obtuse angle. For example, the connection part 152 may extend parallel to the forward-rearward direction. The coupling part 153 may be curled from a distal end of the connection part 152 toward the inner surface of the connection part 152. Meanwhile, the coupling part 153 may be referred to as a hanging part or a hook.

The back cover 150 may be detachably coupled to the holder 170. Specifically, in the process of assembling the back cover 150 to the holder 170 by a user, the coupling part 153 may be guided to the third part 173 along the second part 172. At this time, the force applied by a user is transmitted to the second part 172 through the coupling part 153, so that the second part 172 and the fifth part 175 can be elastically deformed in a counterclockwise direction. Thus, the coupling part 153 may go over the second part 172 and be seated in or coupled to the third part 173. At this time, the contact length between the coupling part 153 and the third part 173 may be L (see FIG. 7). In addition, the curvature of the coupling part 153 may be the same as that of the third part 173.

Meanwhile, the frame 130, the recessed part 160, the holder 170, the fastening member F, and the back cover 150 may include an electrically conductive material such as metal. Accordingly, Electro Magnetic Interference (EMI) noise of a plurality of electronic components installed in the frame 130 can be reduced. In addition, since the recessed part 160 and the holder 170 include a metal material, thermal deformation of these components can be minimized compared to a case in which a material such as plastic or synthetic resin is included.

Meanwhile, an insulating material (not shown) may be coated on the outer surface of the back cover 150. In this case, the insulating material coated on the outer surface of the coupling part 153 may be removed while the coupling part 153 slides on the second part 172 and is seated on the third part 173. Thus, electricity can be conducted from the recessed part 160 to the coupling part 153 through a portion of coupling part 153 where the coating of the insulating material is peeled off. Thus, Electro Magnetic Interference (EMI) noise of a plurality of electronic components installed in the frame 130 can be reduced while insulating the outer surface of the back cover 150.

Referring to FIG. 13, the coupling part 153 of the back cover 150 may be curled while drawing a circle having a third radius r3 with respect to a third center O3 adjacent to the inner surface of the connection part 152.

The back cover 150 may include a reinforcing part 154. The reinforcing part 154 may extend toward the cover part 151 from the coupling part 153. The reinforcing part 154 may face or be parallel to the inner surface of the connection part 152. The reinforcing part 154 may be spaced apart from the inner surface of the connection part 152 by a first gap G1 or may come into contact therewith. Accordingly, the rigidity of the back cover 150 against sagging and torsion may be improved.

Referring to FIG. 14, the back cover 150 may include a rigid part 155. The rigid portion 155 may be bent from the reinforcing part 154. The rigid part 155 may form an obtuse angle with respect to the reinforcing part 154, and may extend from the reinforcing part 154 toward the cover part 151. The rigid part 155 may face or be parallel to the connection part 152 and/or cover part 151. The rigid part 155 may be spaced apart from the inner surface of the cover part 151 by a second distance G2 smaller than the first gap G1 or may come into contact therewith. Accordingly, the rigidity of the back cover 150 against sagging and torsion may be further improved.

Referring to FIG. 15, a rigid part 155' may be bent from the reinforcing part 154. The rigid part 155' may extend in a direction intersecting the extension direction of the connection part 152 and/or the cover part 151. The rigid part 155' may form an acute angle (theta 2) with respect to the inner surface of the cover part 151, and may extend from the reinforcing part 154. The rigid part 155' may be adjacent to the inner surface of the cover part 151. A portion where the reinforcing part 154 and the rigid part 155' are connected may be spaced apart from the inner surface of the cover part 151 by a second distance G2 smaller than the first gap G1, or may come into contact therewith. Accordingly, the rigidity of the back cover 150 against sagging and torsion may be further improved.

According to an aspect of the present disclosure, there is provided a display device including: a display panel; a frame located in a rear of the display panel; a holder coupled to the frame at a rear of the frame; and a back cover covering the rear of the frame, wherein the holder includes: a base in contact with the frame, and fixed to the frame; and a bending part adjacent to the frame, and having one end and the other end fixed to the base, wherein the bending part includes: a first tension part forming the one end of the bending part, and extending from the base; a seating part bent toward the frame from the first tension part, and recessed toward the base; and a second tension part extending from the seating part toward the base, and forming the other end of the bending part, wherein the back cover includes a coupling part curled from a distal end of the back cover toward an inner surface of the back cover, and seated on the seating part.

In addition, according to another aspect of the present disclosure, the frame may include a recessed part which is recessed in rearward direction from a front surface of the frame, and to which the base is detachably coupled.

In addition, according to another aspect of the present disclosure, the recessed part may be adjacent to an edge of the frame, and may be provided in plurality.

In addition, according to another aspect of the present disclosure, the recessed part may further include: a body in contact with the base; a protrusion protruding rearward from the body; and a hole which is spaced apart from the protrusion, and formed while penetrating the body in a front-rear direction, wherein the base may include: a guide hole into which the protrusion is inserted; and a coupling hole which is spaced apart from the guide hole, and aligned with the hole, wherein a part of the body may define a boundary of the hole, and may form a screw thread to which a fastening member inserted into the hole through the coupling hole is fastened.

In addition, according to another aspect of the present disclosure, the body may be elongated, and the protrusion may further include a pair of protrusions spaced apart from each other in a length direction of the body.

In addition, according to another aspect of the present disclosure, a thickness of the base may be smaller than a length of the protrusion protruding in a rearward direction from the body.

In addition, according to another aspect of the present disclosure, the body may include: a first body extending in a direction intersecting the front surface of the frame; and a second body which extends from the first body, and is parallel to the front surface of the frame, the second body in contact with the base, wherein the second tension part may be located in a rear of the first body, and may be spaced apart from the first body.

In addition, according to another aspect of the present disclosure, the base may include: a first base extending from a distal end of the first tension part; and a second base which extends from a distal end of the second tension part, is located between the first base and the frame, and contacts the first base and the frame, wherein a sum of a thickness of the first base and a thickness of the second base may be greater than a thickness of each of the first tension part, the seating part, and the second tension part.

In addition, according to another aspect of the present disclosure, the base may further include a third base extending from the second base, folded toward a rear surface of the second base, and contacting the rear surface of the second base.

In addition, according to another aspect of the present disclosure, the base may be elongated, the seating part may be elongated in a length direction of the base, one end and the other end of the bending part may be adjacent to or next to each other, and an inner surface of each of the first tension part, the seating part, and the second tension part defines a boundary of a space elongated in a length direction of the seating part.

In addition, according to another aspect of the present disclosure, the first tension part may extend toward the frame while forming an acute angle from the base, the seating part may extend from the first tension part toward the frame while drawing an arc of a certain radius with respect to a center located outside the space, and the second tension part may extend from the seating part toward the base while drawing an arc of a certain radius with respect to a center located outside the space.

In addition, according to another aspect of the present disclosure, the seating part may be formed to be curved, and a curvature of the coupling part may be equal to a curvature of the seating part.

In addition, according to another aspect of the present disclosure, the back cover may further include: a cover part forming a rear surface of the back cover; a connection part bent from the cover part, extending toward the frame, and connected to the coupling part; and a reinforcing part extending from the coupling part toward the cover part, and facing an inner surface of the connection part.

In addition, according to another aspect of the present disclosure, the back cover may further include a rigid part bent from the reinforcing part, and extending while forming an obtuse angle with respect to the reinforcing part, or extending while forming an acute angle with respect to the cover part.

In addition, according to another aspect of the present disclosure, a plurality of electronic components may be installed in the frame, and the frame, the holder, and the back cover may have electrical conductivity.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
   a display panel;
   a frame located at a rear of the display panel;
   a holder coupled to the frame at a rear of the frame; and
   a back cover covering the rear of the frame,
   wherein the holder comprises:
   a base configured to be coupled to the frame; and
   a bending part extending from the base,
   wherein the bending part comprises:
   a first part extending from a first side of the base facing the back cover;
   a second part extending from a second side of the base facing the frame such that the first and second parts separate from each other to define a space therebetween; and
   a seating part positioned between the first part and the second part and comprising a bent portion recessed toward the space and defining a seating groove, and
   wherein the back cover comprises a coupling part defined by an inwardly curved edge of the back cover, configured to be disposed in front of the seating groove and seated on the seating groove.

2. The display device of claim 1, wherein the frame comprises a recessed coupling portion which protrudes in rearward direction, and to which the base is detachably coupled.

3. The display device of claim 2, wherein a plurality of recessed coupling portions are provided to be adjacent to edges of the frame.

4. The display device of claim 2, wherein the recessed coupling portion further comprises:
   a body configured to support the base of the holder;
   a protrusion protruding rearward from the body; and
   a hole adjacent to the protrusion, wherein the base of the holder further comprises:
a guide hole into which the protrusion is inserted; and
a coupling hole adjacent to the guide hole and positioned to be aligned with the hole of the recessed coupling portion when the protrusion is inserted into the guide hole, and
wherein a fastening member is inserted through the guide hole and into the hole for securing the holder to the frame.

5. The display device of claim 4, wherein the recessed coupling protrusion comprises a pair of protrusions spaced apart from each other.

6. The display device of claim 4, wherein a thickness of the base is less than a length of the protrusion.

7. The display device of claim 4, wherein the body comprises:
a first body portion angled with respect to a plane of the display panel; and
a second body portion extending from the first body, and parallel to the plane of the display panel,
wherein the second body is configured to contact the base of the holder and the second part of the holder is positioned adjacent to and behind the first body portion.

8. The display device of claim 1, wherein the base comprises:
a first base portion connected to the first part; and
a second base portion connected to the second part and positioned between the first base portion and the frame to contact the first base portion and the frame,
wherein a sum of a thickness of the first base portion and a thickness of the second base portion is greater than a thickness of the first part, greater than a thickness of the seating part, and greater than a thickness of the second part.

9. The display device of claim 8, wherein the base further comprises a third base portion extending from the first base and folded toward a rear surface of the first base portion such that the third base portion contacts the rear surface of the first base portion.

10. The display device of claim 1, wherein the bending part is configured to define a closed loop having a space therein by the first part, the second part, and the seating part along a length of the holder.

11. The display device of claim 10, wherein:
the bending part and the seating part are elongated along the length of the holder such that the closed loop is elongated along the length of the holder.

12. The display device of claim 11, wherein:
the first part extends toward the frame while forming an acute angle with a plane of the base,
the seating part extends from the first part toward the frame to have a curvature based on a radius with respect to a center located outside the loop, and
the second part extends from the seating part toward the base to have a curvature based on a radius with respect to a center located outside the loop.

13. The display device of claim 1, wherein the seating part is formed to be curved, and
wherein a curvature of the coupling part is equal to a curvature of the seating part.

14. The display device of claim 13, wherein the back cover further comprises:
a cover part forming a rear surface of the back cover;
a connection part bent from the cover part, extending toward the frame, and connected to an outer portion of the coupling part; and
a reinforcing part extending from an inner portion of the coupling part to be adjacent to an inner surface of the connection part.

15. The display device of claim 14, wherein the back cover further comprises a rigid part bent from the reinforcing part, to form an obtuse angle with respect to the reinforcing part to form an acute angle with respect to the cover part.

16. The display device of claim 1, wherein a plurality of electronic components are installed in the frame, and the frame, the holder, and the back cover have electrical conductivity.

17. The display device of claim 1, wherein the holder is formed of a metal material.

18. The display device of claim 17, wherein the holder is a unitary metal member bent to form the base and the bending part.

* * * * *